United States Patent
Ishizu et al.

(10) Patent No.: US 8,526,354 B2
(45) Date of Patent: *Sep. 3, 2013

(54) MOBILE COMMUNICATION RELAY DEVICE

(75) Inventors: Kentaro Ishizu, Koganei (JP); Homare Murakami, Koganei (JP); Stanislav Filin, Koganei (JP); Hiroshi Harada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 470 days.

This patent is subject to a terminal disclaimer.

(21) Appl. No.: 12/700,420

(22) Filed: Feb. 4, 2010

(65) Prior Publication Data

US 2010/0195562 A1    Aug. 5, 2010

(30) Foreign Application Priority Data

Feb. 5, 2009    (JP) .................................. 2009-025425

(51) Int. Cl.
*H04B 7/14*    (2006.01)

(52) U.S. Cl.
USPC ......................................................... 370/315

(58) Field of Classification Search
None
See application file for complete search history.

(56) References Cited

U.S. PATENT DOCUMENTS

| 2005/0153666 A1* | 7/2005 | Nguy et al. ................... 455/90.2 |
| 2006/0126613 A1* | 6/2006 | Zweig ............................. 370/389 |
| 2008/0299927 A1* | 12/2008 | Tenbrook et al. ........... 455/226.2 |

FOREIGN PATENT DOCUMENTS

JP    2003283536 A    10/2003

OTHER PUBLICATIONS

Triplet Gate Ltd. News Release, available at http://www.tripletgate.com/wirelessgate/news/homeantenna.pdf, Oct. 21, 2008, pp. 1-3.

* cited by examiner

*Primary Examiner* — Wayne Cai
*Assistant Examiner* — Shantell L Heiber
(74) *Attorney, Agent, or Firm* — Abelman, Frayne & Schwab

(57) ABSTRACT

The present invention provides a user-carriable mobile communication relay device that relays communication between an internal network and an external network, in which even when the device is moved, the device dynamically selects and connects the external network depending on a surrounding radio wave environment or a communication content. The device is provided with an internal network communication adapter 13 compatible with the internal network connecting to a specific terminal device 4; external network communication adapters 11, 12 compatible with external networks with a mobile telephone network and with a wireless LAN at an installation site; a network selection processing portion 102 automatically selecting one or more networks to be connected, out of the external networks, according to stored profile information 141; an internal network connection processing portion 104 establishing or reconfiguring the connection to an internal network selected for a predetermined opportunity; an external network connection processing portion 105 establishing or reconfiguring the connection to an external network selected for a predetermined opportunity; and a communication relay processing portion 101 relay-processing communication between the internal network and the external network.

7 Claims, 8 Drawing Sheets

MOBILE COMMUNICATION RELAY DEVICE

CROSS-REFERENCE TO RELATED APPLICATIONS

This application is related to and claims priority under 35 USC §119(a) to Japanese Patent Application 2009-025425 filed on Feb. 5, 2009 which is incorporated by reference herein.

BACKGROUND OF THE INVENTION

1. Field of the Invention

The present invention relates to a mobile communication relay device that users can easily carry, and in particular, relates to a device capable of connection to a plurality of external networks in a configuration that relays communication between an internal network and an external network.

2. Description of the Related Art

Heretofore, a communication relay device known as a wireless LAN router is in widespread use as a device enabling a plurality of terminal devices to connect to external networks such as the Internet in residential or corporate settings. The device configures a LAN (Local Area Network) that is an internal network between the device and a terminal device, and is loaded with a function for routing communication from a communication terminal to an external network, a Dynamic Host Configuration Protocol (DHCP) server function for allocating an Internet Protocol (IP) address for the communication terminal, a Network Address Translation (NAT) function for performing address conversion, a Domain Name System (DNS) server function for converting a domain name and an IP address (DNS forward function), for example.

On the other hand, with communication environments on the street (e.g., wireless hotspots), various wireless access systems such as a mobile telephone, a wireless LAN, and a Personal Handy-phone System (PHS) are widespread, and a wireless Metropolitan Area Network (MAN) service such as WiMax is being introduced.

While these various wireless access systems are being offered, beyond the configuration enabling a connection to a wireless LAN in residential or corporate setting that is not sufficient, there is a growing demand for sharing an external network connection by using a plurality of communication terminals even when the user is away from his/her usual place. There is also a growing demand for separating various connection machines and connection processing depending on each wireless access system from a communication terminal main body.

One product presently available is "Wireless Gate Home Antenna for emobile" from TripletGate Inc. of Tokyo, Japan which is a device that relays a connection to the Internet by High-Speed Download Packet Access (HSDPA) and provides an external connection for a terminal by wireless LAN (referenced in Non-Patent Document 1).

This device is capable of Internet connection to a plurality of terminals simply when the device is installed, even in locations where wired networks cannot be utilized.

However, this device can only be connected to a single wireless operator using HSDPA. Therefore, in addition to the inability to be used outside of the HSDPA area, even an area offering a more suitable wireless access system cannot be selected.

On the other hand, even by using a technique already available including a method in which a communication adapter to handle a plurality of wireless access systems is installed in a well-known personal computer so that the user is allowed to switch a connection destination by him/herself is employed, various types of external networks can be selectively used.

However, it is often not conveniently portable, and the effort to understand and manually switch the communication areas, and the like, is troublesome.

A known technique is disclosed in Japanese Patent Laid-Open No. 2003-283536 (Patent Document 1), which teaches a mobile router device including a first wireless interface for connecting to a first network and a second wireless interface for connecting to a second network different from the first network. The device is configured to include an address assignment portion for assigning an IP address that a user personally retains in advance for a plurality of communication terminals connected to the second wireless interface, and a communication controller for connecting the second wireless interface and the first wireless interface by utilizing the IP address assigned by the address assignment portion so as to perform packet transmission and reception between the first network and the communication terminal.

The above-described device is similar to that offered by TripletGate described above, and does not functionally differ from a well-known stationery wireless LAN router. Therefore, there is not provided in the art a technique for selectively using available wireless access systems offered by various wireless operators according to a location and an application or use.

Patent Document 1: Japanese Patent Laid-Open No. 2003-283536

Non-Patent Document 1: Internet URL, http://www.tripletgate.com/wirelessgate/news/homeantenna.pdf (searched on Feb. 5, 2009).

SUMMARY OF THE INVENTION

The present invention has been created in view of the problems inherent in the conventional technique, and an object thereof is to provide a user-carriable mobile communication relay device that relays communication between an internal network and an external network, wherein even if this device is moved, the external network is dynamically selected by a surrounding radio wave environment and a communication content so as to connect to the external network.

To solve the problems of the prior art, the present invention provides a mobile communication relay device described below.

That is, a device relaying communication between an internal network and an external network, i.e., the user-carriable device is provided with: an internal network communication adapter compatible with the internal network connecting to a single or a plurality of specific terminal devices; and an external network communication adapter compatible with two or more external networks. The external network communication adaptor desirably includes at least two types, i.e., a mobile telephone network and a wireless LAN at an installation site.

The present invention is characterized by being provided with a network selection processing portion automatically selecting one or more networks to be connected, out of the external networks, according to previously provided and stored profile information. By using an external network connection processing portion establishing or reconfiguring the connection to an external network selected for a predetermined opportunity, the internal network, and the external network, communication is relay-processed.

In the stored profile information, an order of priority of the external networks to be connected may be defined. The network selection processing portion is capable of selecting the external network according to the order of priority.

In the stored profile information, verification information necessary for connection to each external network may be stored. The external network connection processing portion is provided for establishing or reconfiguring the connection to the external network by employing the verification information.

A selection rule for a communication channel when the external network or the internal network is a wireless LAN can be provided in the profile information.

At least one of the external network connection processing portion or the internal network connection processing portion acquires information about an available channel at a current site. When there is an available channel, an available channel table tabulating, for each channel, numbers of available channels continued before and after a reference channel is produced, and the channel is selected according to an available status on the available channel table.

In a configuration in which a selection rule is provided in the stored profile information for a communication channel when the external network or the internal network is a wireless LAN, at least one of the external network connection processing portion or the internal network connection processing portion can acquire a signal strength of a channel in use at a current site, and produce a signal strength table tabulating the signal strengths of channels in use.

In operation of the present invention, a channel is selected according to the signal strength for each channel on the signal strength table.

The present invention can also include a configuration such that at least one of the external network connection processing portion and the internal network connection processing portion in the mobile communication relay device selects, when there is the available channel on the available channel table, a channel with a largest number of available channels continued in back and forth directions, and on the other hand, selects, when there is no available channel, a channel having a weakest signal strength from the signal strength table.

It is also possible to employ a wireless communication system in which any server device on an external network side is previously provided with a link aggregate management portion for performing a link aggregate by integrating and dispersing traffic with a communication terminal into and over a plurality of links. In this case, the mobile communication relay device is provided with a terminal link aggregate management portion performing a link aggregate on traffic with the link aggregate management portion, and the network selection processing portion is capable of selecting at least any one of a plurality of external networks or a plurality of channels in a wireless LAN.

The network selection processing portion can also be provided with a connection policy information production portion employing required condition information input from an input device or stored in the profile information regarding a predetermined communication parameter in the wireless communication network so as to produce the connection policy information table based on the required condition information, and the network selection processing portion selects the network according to the connection policy information table.

The communication parameter(s) may be one of or a combination of a communication speed, a communication amount, a communication line load, a packet loss rate, a communication delay, a jitter, a radio wave strength, a communication charge, and a value calculated from a value of each of these parameters according to a predetermined calculation formula.

The mobile communication relay device can also be provided with: a communication network measurement information collection portion extracting from each wireless communication network at least any information of the communication parameters; and a connection policy information evaluation portion evaluating a content of the connection policy information table based on the information collected by the communication network measurement information collection portion, and the connection policy information production portion updates the connection policy information table according to the evaluation.

As a result of including the above-described configuration, the present invention provides the following advantageous effects:

First, by offering a mobile communication relay device provided with a communication adapter that is compatible with an external network including a mobile telephone network and a wireless LAN at an installation site, a communication relay device can be carried for use that is compatible with both network communication by a mobile telephone network available in a wide area and network communication by a public wireless LAN service available in urban areas and various institutions. Since it is compatible with each of the networks, the areas of potential use are expanded, which improves the utility of the device.

To be compatible with the different external networks in this manner, since various conditions for the network, such as a communication speed and communication charges, differ, and since there are frequent opportunities to carry it to unknown locations, it becomes difficult for the user to even manually select the optimal network. Therefore, since the network can be selected automatically with stored profile information, it is possible to significantly improve the utility of the mobile communication relay device.

When verification information necessary for connection with the external network is stored in the profile information, it becomes possible to automatically make this mobile communication relay device utilizable for services that need verification such as a connection to a wireless LAN service when going outside certain networks, for instance.

By providing wireless LAN communication channel selection rule(s) to the stored profile information, the optimal channel for communication can be selected in locations where a plurality of communication channels are employed. In particular, if an available channel table is created, it is possible to easily realize communication employing a channel having a large number of available channels in a back and forth direction.

With a configuration to acquire a signal strength for a channel in use, the level of signal interference is taken into consideration from the signal strength, which serves to select the optimal channel for the communication.

Combined with the above-described features, if there are available channels in back and forth directions, that channel is selected; if not, a channel with a weaker signal strength can be selected.

Furthermore, if neither selected channel can be found, another external network can be selected.

In a configuration arranged on this device including link aggregate management portion on a network side, a plurality of external networks can be employed for aggregation. To perform this type of link aggregation, a plurality of communication adapters are used. While this can be considered difficult with a compact terminal, including this function on a mobile communication relay device as is the case with the device of the present invention, even the compact terminal can utilize preferable communication through link aggregation.

By producing a connection policy information table based on required condition information, the user can select a network in a manner to suit a required condition set by the user. In particular, it is possible to automatically take into consideration various conditions such as a requirement for an application executed on a terminal device and a communication charge when selecting the network.

Furthermore, by providing a connection policy information evaluation portion for evaluating a content of the connection policy information table, the connection policy information table can be updated to the optimal information.

According to the present invention, the mobile communication relay device is capable of disguising or hiding the fact that a plurality of types of external networks exist for an internal network. Also, even if the terminal is only compatible with a wireless LAN, it is possible to enable connection to the terminal via an external network that is not compatible.

BRIEF DESCRIPTION OF DRAWINGS

The invention will be described in further detail below and with reference to the attached drawings in which the same or similar elements can be referred to by the same number, and where.

DETAILED DESCRIPTION OF THE INVENTION

Hereinafter, embodiments of the present invention will be described based on embodiments shown in drawings. It is noted that the embodiments are not limited to those given below.

The present invention relates to wireless communication relay devices, and in particular to those which relay a network for an external connection and one or more communication terminals. The present invention provides a technique such that even if the wireless communication relay device is moved or relocated, the wireless communication relay device by itself dynamically selects and connects the optimal wireless system for an external connection by a surrounding radio wave environment and a communication content. Thus, a communication terminal becomes capable of performing communication employing the optimal wireless system without recognizing a plurality of wireless systems.

Figure 1:
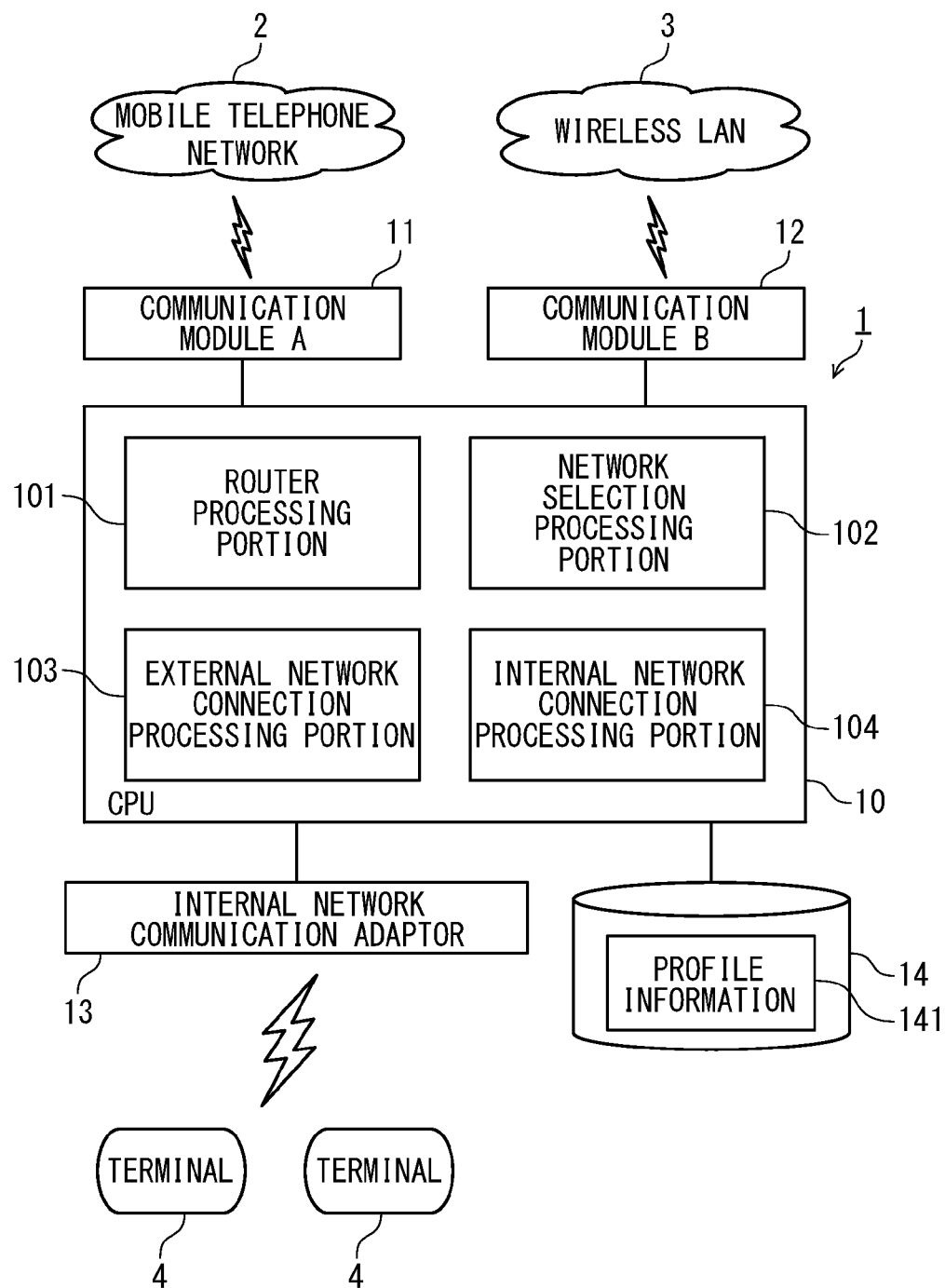
FIG. 1 is a configuration diagram of a mobile communication relay device according to a first embodiment of the present invention.

FIG. 1 is a configuration diagram of a mobile wireless communication relay device (1) according to one embodiment of the present invention. The present invention can be easily provided to a mobile wireless LAN router as disclosed in Non-Patent Document 1 by packaging functions of the present invention.

Hardware for this device (1) includes: a Central Processing Unit (CPU)(10) configuring an execution processing portion for performing the processing portions of the present invention; a communication module A (11) for communicating via a mobile telephone network (2) as an external network communication adapter; a communication module B (12) for connecting to a wireless LAN (3) in a wireless hotspot, e.g., a public wireless hotspot, or a residential or corporate wireless LAN; an internal network communication adapter (13) for communicating with a user's terminal (4); and storage device (14) such as a memory in which profile information (141) described herein is stored.

The communication modules (11) and/or (12) are communication modules for connection to wireless communication networks such as a mobile telephone communication card, a Personal Handy-phone System (PHS) data communication card, and a wireless LAN card, and are widely provided in Compact Flash (CF) cards, a Peripheral Component Interconnect (PCI) card, a Universal Serial Bus (USB) connection device, or the like. In general, a single antenna is installed on a communication module but joint use is possible if the antenna is near a frequency used, and jointly used antennas are acceptable with differing communication modules.

The internal network communication adapter (13) is a device for configuring an internal network, and can be configured by a wireless LAN adapter or a Bluetooth® adapter. The internal network communication adapter (13) can be installed separately from each of the above-described communication modules (11) and/or (12) but in reality, can be jointly used for an external network connection and an internal network connection. The same is true of the antenna.

Of course, this embodiment is one embodiment of the invention, and the number of communication modules and configurations can be established as desired. A single communication module can be made compatible with a plurality of wireless communication networks on a software basis.

The CPU (10) includes: a router processing portion (101) for providing relay processing of communication between an internal network and an external network as well as a well-known router function; a network selection processing portion (102) for automatically selecting the external network according to profile information (141); an external network connection processing portion (103) for connecting to the external network; and an internal network connection processing portion (104) for connecting to the internal network.

The router processing portion (101) includes a well-known NAT function to thereby reciprocally convert an external network IP address to an internal network local address so that communication between the terminal (4) within the internal network and the external network is routed.

There is also provided a DHCP server function that can automatically assign a local address to the terminal (4). A DHCP server can also assign a gateway server address, a DNS server addresses, a subnet mask, etc. Furthermore, there is also provided a DNS server (DNS forward) function that reciprocally converts a domain name and an address.

This device (1) is of mobile type, and is thus characterized in that a use location is changed. An examples of external network that can be used in the widest area includes the mobile telephone network (2), and depending on a user's contract condition, the communication charges may be high.

Also, with a current service, the communication speed may not be sufficient. However, if connecting to a household or company wireless LAN or connecting to a wireless LAN in a street hotspot, the area may be extremely limited but advantages are provided to the user in terms of communication charges and communication speed.

To solve this, the network selection processing portion (102) in the present invention references the profile information (141), and automatically selects the optimal network from a plurality of external networks. A selection rule in this embodiment will be described. First, as shown in Table 1, a predetermined order of connection priority with respect to external networks that are candidates for connection is stored in the profile information (141). As shown in Table 1, a method for defining the order of priority can be defined for each service or access point, or can be defined for each communication system (protocol, etc.). Both can also be defined.

TABLE 1

| order of priority | Service |
|---|---|
| 1 | Household wireless LAN |
| 2 | company A hotspot |
| 3 | company B PHS |
| 4 | company C data communication service |
| 5 | company D mobile telephone service |

The simplest selection rule is that defined only in Table 1. When first connecting to the external network, the communication module attempts to connect from a service with the highest priority. According to Table 1, first, the communication module B (12) scans the wireless LAN and if there is a household wireless LAN Service Set Identifire (SSID), connection is made with that access point. If the household SSID is not discovered, a hotspot of Company A is searched.

If neither the first or second priority can be found, a PHS communication module (not shown) is employed in an attempt to connect to a PHS circuit of Company B. If a PHS radio wave is detected here, a connection is made. After connecting to the service with the highest priority in this manner, the connection may be optionally made to be maintained even if a service with a higher level becomes utilizable, or connection may be optionally automatically reconfigured.

With the former method, the service in use is maintained, and thus the communication is not interrupted. This is particularly preferable when using applications such as voice call or video distribution. With the present invention, if the power for this device (1) is turned ON, if connection with the terminal (4) is established in the internal network, if a communication request is conducted from the terminal (4) to the external network, or for any particular instance, an initial connection is made based on the above-described selection rule, then the connection may be optionally maintained.

Figure 2:
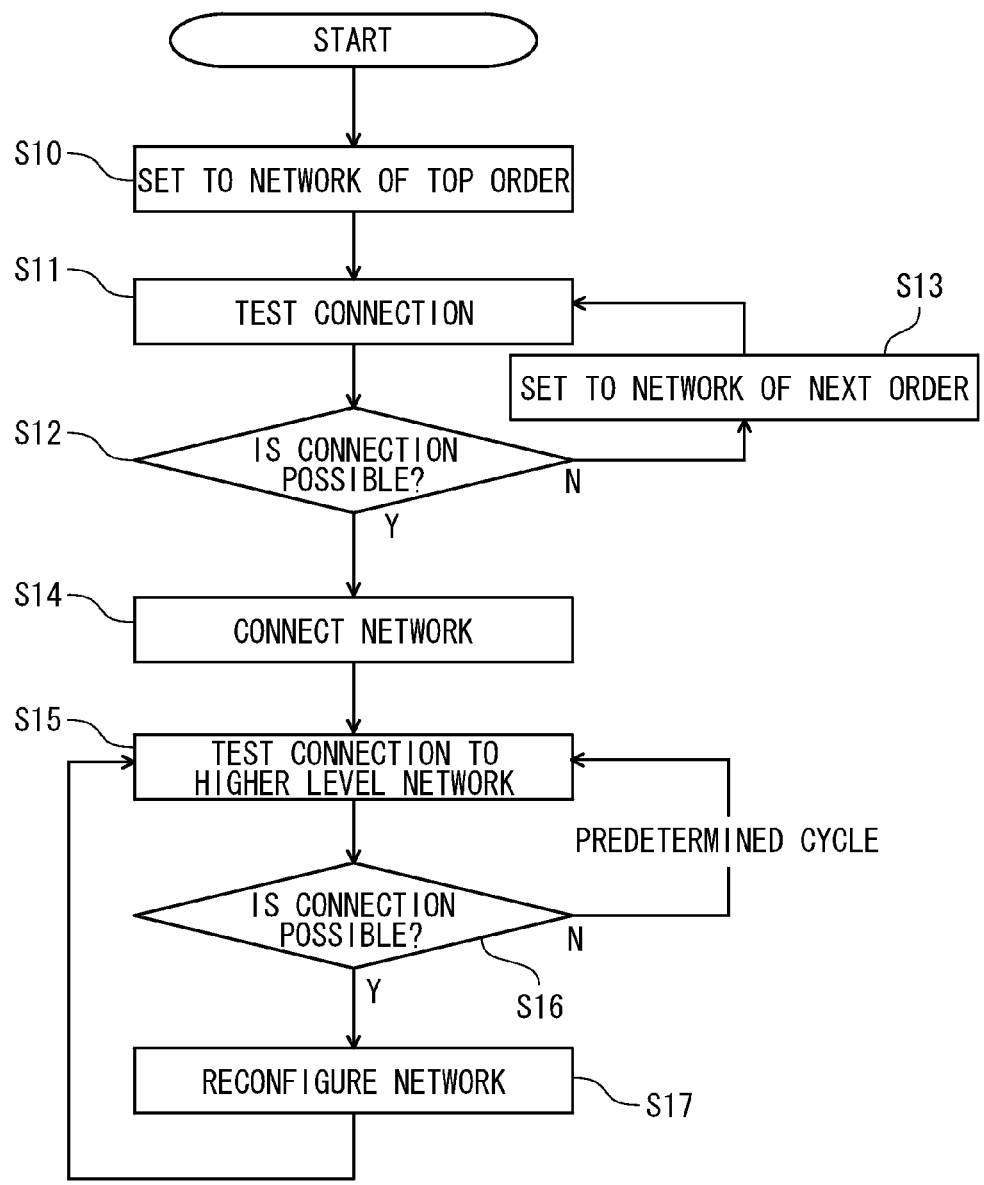
FIG. 2 is a flowchart showing a method of selecting an external network according to the present invention.

On the other hand, with the latter method, if a service with a higher priority than the service currently used for communication becomes available for communication, the connection is reconfigured to that service. FIG. 2 shows a flowchart of this case. First, as indicated above, a network of the top order is set (S10), the connection is tested (S11) and if the connection cannot be made (S12), a network of a next order is set (S13). Connection testing (S11) is repeated until the connection is made.

Even after making a network connection (S14), a higher level network connection is tested (S15). For example, even while connected to the above-described PHS, the communication module B (12) performs a scan of the wireless LAN at a predetermined cycle and searches for services with higher levels of priority (top and second orders).

Additionally, for example, if a service for a hotspot of Company A is discovered (S16), the connection with PHS is cancelled, and connection is made with the wireless LAN for the hotspot of Company A. In the present invention, processing for dynamically changing a connection destination in this manner is referred to as "reconfiguration" (S17). Then, as long as there is a network with a highest level of priority, the connection is tested for networks of a higher level (S15).

If the external network connected by the network selection processing portion (102) is selected, the external network connection processing portion (103) performs connection processing for that service. The connection processing uses well-known techniques, and in the present invention, miscellaneous information needed for a connection can be provided in the stored profile information (141).

The information needed for a connection includes a telephone number for a connection destination upon connection to a mobile telephone network or a PHS network, and an SSID or WEP (Wired Equivalent Privacy) confidential key upon wireless LAN connection. Additionally, upon connection to services requiring verification, it is possible to include verification information such as a user name and a password for a dialup connection as well as a user name and a password to enable the utilization of hotspots.

The external network connection processing portion (103) reads these pieces of miscellaneous information from the profile information (141) so as to perform the network connection processing.

To reconfigure a connection between different services, a technique relating to switching networks such as an existing handover technique can be employed where appropriate. Also, as indicated herein, a technique for switching a combination of linked communication networks by link aggregation can be employed.

Opportunities to search for other services in the external network in the above case can be established at predetermined time intervals, such as every 30 seconds, every minute, or every five minutes, and can be established by the user with the button key.

Also, this device (1) may be optionally provided with a Global Positioning System (GPS) (not shown), and additional searches can be made when the position changes over a predetermined distance. Alternatively, it is acceptable to search again when it is detected that the communication is handed over between base stations or when a radio wave strength changes to exceed a predetermined value. These threshold values can be stored in the profile information (141) for each external network.

It is acceptable to employ an arbitrary wireless network as the external network in the present invention. In addition to the above-described wireless LAN (conforming to 802.11b/g) and PHS, it is acceptable to employ HSDPA (High-Speed Downlink Packet Access) utilizing a mobile telephone network, a future standard WiMax (Worldwide Interoperability for Microwave Access), a next generation PHS, or the like. In addition, the connection may be optionally directly made to the external networks by using a LAN cable, a USB cable, etc.

A method for establishing an internal network connection will be described. Information necessary for an internal network configuration can also be stored in the profile information (141). In this embodiment, a wireless LAN module is employed for the internal network communication adapter (13) so as to connect using the terminal (4) and the wireless LAN. The wireless LAN conforms, for example, to IEEE802.11b/g, and uses WEP for encryption.

The internal network of the present invention can be established by any method as long as it is possible to configure a network. For example, a configuration in which a LAN port is arranged and the terminal (4) is connected with a LAN cable is acceptable. There may be a plurality of LAN ports so as to achieve a hub function. Also, a wireless LAN module may be included together therewith.

Figure 3:
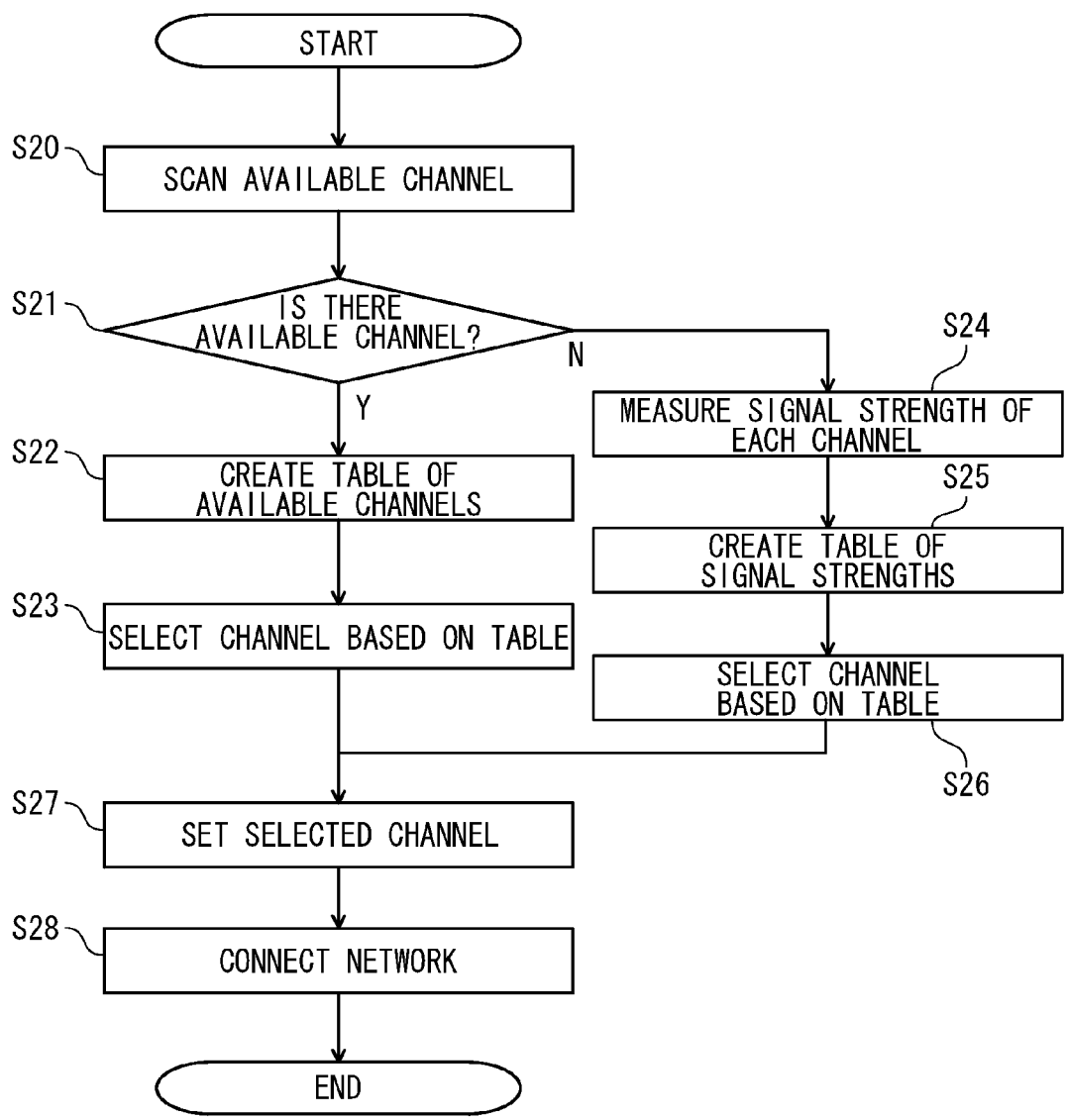
FIG. 3 is a flowchart showing a method of determining a channel of an internal network according to the present invention.

As shown in FIG. 3, information on an available channel or on a signal strength is employed for selecting channels used for the wireless LAN in the present invention. First, the internal network connection processing portion (104) operation enables the internal network communication adapter (13) to scan (S20) for available channels in the installed position of this device (1). Channels 1 to 14 can be utilized with 802.11b and channels 1 to 13 can be utilized with 802.11g, but for this embodiment, channels 1 to 11 are utilized.

If the results of the scan show available channels (S21), the available channels for each channel in back and forth directions are tabled (S22). For example, as shown by the scan results in Table 2, if the access points in the vicinity use channel 6 and channel 11, an available channel table is as shown in Table 3.

TABLE 2

| (Scan Result) | | | | | | | | | | |
|---|---|---|---|---|---|---|---|---|---|---|
|  |  |  |  |  | X |  |  |  |  | X |
| 1ch | 2ch | 3ch | 4ch | 5ch | 6ch | 7ch | 8ch | 9ch | 10ch | 11ch |

TABLE 3

(Available Channel Table)

| channel | No. of channels available in front direction | No. of channels available in back direction |
|---|---|---|
| 1ch | 4 | 4 |
| 2ch | 5 | 3 |
| 3ch | 6 | 2 |
| 4ch | 7 | 1 |
| 5ch | 8 | 0 |
| 6ch | x | x |
| 7ch | 0 | 3 |
| 8ch | 1 | 2 |
| 9ch | 2 | 1 |
| 10ch | 3 | 0 |
| 11ch | x | x |

If the internal network connection processing portion (104) described above creates an available channel table by obtaining scan results from the internal network communication adapter (13), channel 1 has four channels available in a front direction and channel 11 has no channel available in a back direction. Additionally, for example, a search is made for channels with four or more channels available in back and forth directions in order from a channel with the lowest number, and a channel that is found first is selected (S23). In the example in Table 3, a channel 1 has four or more channels available in back and forth directions and so the channel 1 is selected. The reason why the number of channels is four or more is that if there are intervals with four or more channels, then good communication can be performed. However, for example, five channels or three channels can also be used for this value.

If there is no space available of four or more channels in back and forth directions, a threshold value is decreased to three channels in the same directions and then to two channels in the same directions. For example, scan results and an available channel table when access points in the vicinity use channel 1 and channel 6 are as found in Tables 4 and 5.

TABLE 4

| (Scan Result) | | | | | | | | | | |
|---|---|---|---|---|---|---|---|---|---|---|
| X |  |  |  |  | X |  |  |  |  |  |
| 1ch | 2ch | 3ch | 4ch | 5ch | 6ch | 7ch | 8ch | 9ch | 10ch | 11ch |

TABLE 5

(Available Channel Table)

| channel | No. of channels available in front direction | No. of channels available in back direction |
|---|---|---|
| 1ch | x | x |
| 2ch | 0 | 3 |
| 3ch | 1 | 2 |
| 4ch | 2 | 1 |
| 5ch | 3 | 0 |
| 6ch | x | x |
| 7ch | 0 | 4 |
| 8ch | 1 | 3 |
| 9ch | 2 | 2 |
| 10ch | 3 | 1 |
| 11ch | 4 | 0 |

According to Table 5, there are no channels with four channels or three channels available in back and forth directions, and thus, a channel with two channels available, i.e., channel 9, is selected. If there are only a smaller number of available channels, the channel is selected in a manner to increase the channels in back and forth directions as much as possible. Examples in Tables 6 and 7 below are situations when the access points in the vicinity use channel 1, channel 6 and channel 11.

TABLE 6

| (Scan Result) | | | | | | | | | | |
|---|---|---|---|---|---|---|---|---|---|---|
| X |  |  |  |  | X |  |  |  |  | X |
| 1ch | 2ch | 3ch | 4ch | 5ch | 6ch | 7ch | 8ch | 9ch | 10ch | 11ch |

TABLE 7

(Available Channel Table)

| channel | No. of channels available in front direction | No. of channels available in back direction |
|---|---|---|
| 1ch | x | x |
| 2ch | 0 | 3 |
| 3ch | 1 | 2 |
| 4ch | 2 | 1 |
| 5ch | 3 | 0 |
| 6ch | x | x |
| 7ch | 0 | 3 |
| 8ch | 1 | 2 |
| 9ch | 2 | 1 |
| 10ch | 3 | 0 |
| 11ch | x | x |

In the above case, there were no channels that have two available channels in back and forth directions. Of the channels with one or more channels available in back and forth directions, channel 3 has one channel in a front direction and two channels in a back direction; channel 4 has two channels in a front direction and one channel in a back direction; channel 8 has one channel in a front direction and two channels in a back direction; and channel 9 has two channels in a front direction and one channel in a back direction. Sums of the channels in back and forth directions are both three channels, and thus, the channel 3 is selected since it is the lowest channel number (S23). Based on only the sum of the channels in back and forth directions, channel 5 has the same sum (it has three channels in a front direction and 0 channels in a back direction). However, if the channels are adjacent (if there are 0 available channels), since it is easier to encounter interference, the one with available channels in back and forth directions is prioritized.

On the other hand, if there are no available channels (S21), the internal network communication adapter (13) measures a signal strength of a radio wave from each access point (S24). Additionally, the internal network connection processing portion (104) creates a table of the signal strength (S25). An example of the signal strength table at this point is shown in Table 8.

TABLE 8

(Table of Signal Strengths of Channels Used)

| channel | signal strength |
| --- | --- |
| 1ch | −90 db |
| 2ch | −60 db |
| 3ch | −95 db |
| 4ch | −88 db |
| 5ch | −60 db |
| 6ch | −50 db |
| 7ch | −40 db |
| 8ch | −55 db |
| 9ch | −72 db |
| 10ch | −80 db |
| 11ch | −67 db |

In this case, by selecting the channel with the lowest signal strength, the interference can be held to a minimum. In the case of Table 8, channel 3 is selected (S26). The above-described channel selection processing (S23) is performed (S26) according to whether or not there are available channels, and those resulting selected channels are set as the internal network wireless LAN channel (S27). The internal network connection processing portion (104) performs connection processing with these channels (S28).

As another embodiment, detection of available channels and measurement of the signal strength can be combined, and when detecting the available channels, only the channels greater than a predetermined threshold value may be optionally detected. The reason for that is that if there are channels with sufficiently low signal strength, there will be less likelihood of communication interference.

If the internal network can select a plurality of networks such as a wired LAN and a wireless LAN, an order of priority may be optionally stored in the profile information (141) similarly to the external network. For example, in the case of being able to connect using a wired LAN, the wired LAN is wired to connect to the terminal (4) to enable selection of a wireless LAN only when connection is not possible.

A method for selecting channels in such a wireless LAN can be employed for the wireless LAN connection as the external network. That is, the access points in the vicinity are scanned with the communication module B (12) to create an available channel table. Then, the channel is selected according to the method for selecting channels shown in FIG. 3.

The scan at this point is a scan for performing a good connection with the access points registered in the profile information (141) by using the external network, and for this reason, a channel currently used by the access point to be connected should be an available channel. Also, if the channel currently in use is optimal from the above-described available channel table or if there is no concern of interference, that channel can be used as is.

On the other hand, if there is great concern of interference for the channel currently in use, the current channel is switched to another channel. To change a subject slightly, the current case is that where the external network side is the access point, which is different from the case of the internal network where this device (1) is the access point, and thus, to change the communication channel, it is necessary that the access point is firstly connected with the channel employed by the access point side and the channel that should be used is notified. As a result, a setting change acceptance portion (not shown) compatible with this device (1) is provided on the access point, and when there is a request to change the communication channel from this device (1), the current channel is changed to the channel to establish the connection. According to this method, it is possible to set a channel employed for communication with an access point while avoiding a channel that is easily subject to interference in positions of this device (1).

Figure 4:
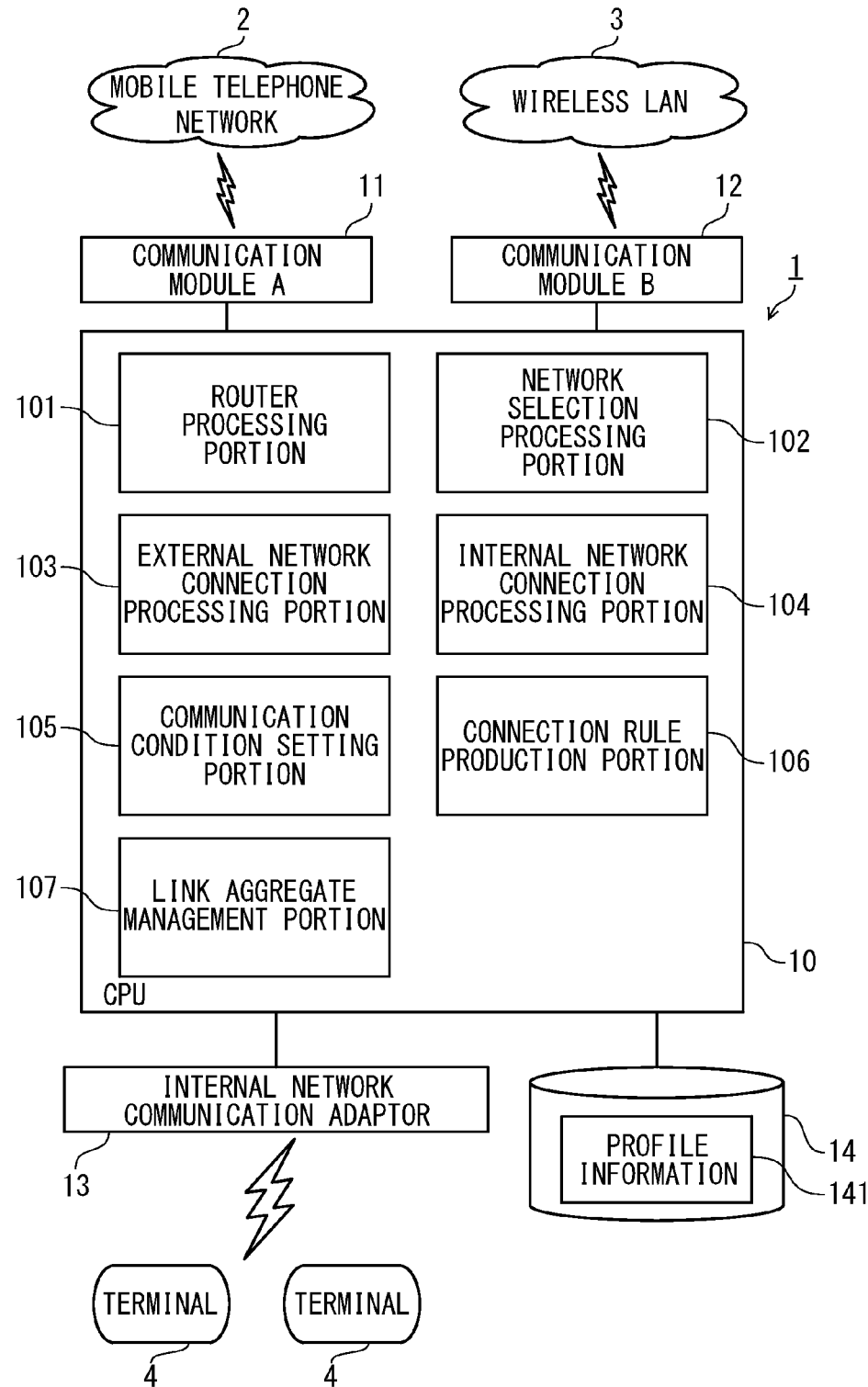
FIG. 4 is a configuration diagram of a mobile communication relay device according to a second embodiment of the present invention.

In a further embodiment of the present invention, it is possible to perform network selection processing in the network selection processing portion (102) to satisfy the required conditions for the communication parameters needed by the terminal (4). This processing is described in further detail herein. FIG. 4 is a configuration diagram of this device (1) according to this embodiment.

First, based on the type of application executed by an application execution processing portion of the terminal (4) (not shown), it is possible to set a band, a delay, a jitter, a loss rate, etc., needed by the communication conditions setting portion. As is well known, depending on the type of applications, there are different standards for a communication quality such as a standard requiring high volume throughput or that requiring a low error rate. As described, the communication conditions setting portion (105) is arranged on the CPU (10), but it can optionally be arranged on the terminal (4).

As a method for acquiring the type of application, a packet that goes through the internal network communication adapter (13) or a packet that is processed in the router processing portion (101) may be monitored, and an application type or name can be specified from the packet status. In particular, a method for specifying the types will be described by classifying into voice call, video streaming, file transfer or other application. The reason for such classification is that in these applications, it cannot be said that if the throughput is merely high, the quality of the communication on such applications improves; the selection needs to be made taking also a packet loss and a jitter for each base station into consideration.

First, with respect to a voice call, when out of relay UDP (User Datagram Protocol) packets, a series of packets (having the same destination address) in which the average throughput is less than 32 kbps and that throughput is continued for two or more seconds are detected, detection is made such that the voice call application is being executed.

With respect to a video streaming application, when out of the relay UDP packets, a series of packets (having the same destination address) in which the average throughput is equal to or more than 32 kbps and that throughput is continued for two or more seconds are detected, detection is made such that the video streaming application is being executed.

With respect to a file transfer application that conducts downloading or uploading with a certain server, when the following packet is detected, detection is made such that the file transfer application is being executed. That is, a series of packets (having the same destination address) or TCP (Transmission Control Protocol) packets transmitted or received by the terminal (4), in which a destination port number is either 80, 21 or 20, average throughput is equal to or more than 32 kbps, and that throughput is continued for five or more seconds.

If none of the above applies, the application is classified as "other". The status of these packets is stored in an external storage device as a packet status database. An example of the packet status database is shown in Table 9.

TABLE 9

(Packet Mode Database)

| Protocol | average throughput | duration (time) | destination port No. | type |
|---|---|---|---|---|
| UDP | Less than 32 kbps | 2 sec or more | Indefinite | Voice call |
| UDP | 32 kbps or more | 2 sec or more | Indefinite | Video |
| TCP | 32 kbps or more | 5 sec or more | 80/20/21 | File transfer |
| Indefinite | Indefinite | Indefinite | Indefinite | others |

After detecting the types of application using any of the above methods, the necessary communication conditions are set depending on the types. In this case also, the value of the communication quality may also be defined according to a database such as that shown in Table 10 for each type.

TABLE 10

(Communication Condition Database)

| Type | Communication band | Delay | jitter | Loss rate |
|---|---|---|---|---|
| Voice call | 50 kbps or more | 30 mille sec or less | 10 mille sec or less | indefinite |
| Video | 200 kbps or more | 100 mille sec or less | 50 mille sec or less | 5% or less |
| File transfer | 500 kbps or more | 100 mille sec or less | 50 mille sec or less | 10% or less |
| Others | Indefinite | 300 mille sec or less | 80 mille sec or less | 15% or less |

As described above, the present invention is not limited to the communication quality required by the usable wireless link or application, but can employ various communication conditions. When considering a general communication condition, the following are of importance: (1) wireless information, (2) communication quality, (3) stability, (4) cost, and (5) power consumption.

(1) Wireless Information (Radio Frequency (RF))

In order for the mobile communication relay device (1) to utilize a wireless resource, firstly, this device (1) needs to be in a coverage area of the wireless resource. To know what type of wireless resources are utilizable when a certain terminal is in a certain position, there are two alternate methods. One is that the terminal itself scans to search around, and another is to obtain the information from a server device in the external network. It is noted that this system can properly use in combination these methods.

With the latter method, it suffices if a server device that covers a plurality of wireless access networks (for example, a large number of hotspots) has information on the coverage areas of each wireless access network. This information is stored in a hard drive or memory, for example. This method is considered to have a greater effect when a frequency target range is wider and when it is difficult to predict which wireless resource can be utilized.

(2) Communication Quality (End-to-end QoS)

As described previously, since the necessary communication quality varies depending on each application used, not only binary information determining if the connection as described in (1) is possible but also detailed Quality of Service (QoS) information is needed. Examples of this QoS information include a delay, a jitter, a loss rate, and a utilizable band.

In particular, if a new terminal (this device) interrupts a congested wireless resource, there will be an adverse effect on the communication quality of another terminal already utilizing this wireless resource, and thus, it is considered to be important to precisely forecast what level bands will be usable by this new terminal. This utilizable band information becomes necessary information for achieving the object of this system that is designed to improve the efficiency of the use of the frequency by implementing a load balance of the whole network.

(3) Stability

In the wireless communication where the communication quality is subject to dynamic fluctuations, in addition to the instantaneous QoS information described in (2), the stability is also an important parameter. For example, there can be cases when rather than a wireless resource that can temporarily use a wide band, the stability (even if the band is narrow) is desirable.

As a specific example when the communication is continued while the wireless resources are repeatedly switched as the user moves, it is conceivable that there will be a demand to decrease the number of times of switches as much as possible. To achieve this object, it is effective to estimate a time that the wireless resource can be utilized continuously.

(4) Cost

Depending on the user, application or type of uses, it is conceivable that there will be cases where low communication charges take priority over a QoS guarantee. From a viewpoint of user satisfaction, the communication charges are also an important parameter for wireless resource selection.

(5) Terminal Power Consumption

Since communication is not possible if a terminal battery fails during wireless communication utilization, the amount of power consumption needed for such communication is also an important factor in the selection of the wireless resource.

Taking the communication conditions above into consideration, the network selection processing portion (102) selects the external network for the wireless communication, the access points, and the communication system. The selection processing details are as follows.

The simplest method for taking the communication quality into consideration is to store a summary of the communication quality between each external network and this device (1) on the storage device (14) as a database. This is followed by, when receiving the above-described communication conditions, selecting the external network and the communication system in a manner to satisfy the required communication qualities.

However, with this method, it is necessary to measure and record a communication state between each communication terminal and base station in advance. Also, depending on the position of this device (1), since the communication quality varies, a good communication system may not be able to be selected all the time. To solve this, the connection rule is stored in the profile information (141) and a connection rule production portion (106) is arranged in the CPU (10). This configuration will be described next.

What kind of communication parameters should be employed to determine the connection rule will be described. Information that can be acquired corresponding to the above-described (1) to (5) requirement conditions is as follows:

(1) Wireless Information (1-1) Wireless Type

First, information on the type of wireless is essential. Since this is determined by the kind of communication module installed, this is known information for this device (1).

(1-2) RSSI (Received Signal Strength Indicator)

This is information to estimate the communication quality. The type of wireless, BER (Bit Error Rate) and other parameters can be utilized. These can also be acquired based on the information from the communication modules (11) and/or (12) using well-known techniques.

(2) Communication Quality (End-to-end QoS)

(2-1) Delay, Communication Delay Time (2-2) Jitter (2-3) Loss Rate

The three items listed above are information essential for securing the service quality. The required QoS level varies depending on the type of application. These can be measured and calculated employing a well-known technique by the communication module(s) (11) and/or (12) and router processing portion (101).

(2-4) Access Point Band

A value used in this case is a value unique to the access point or wireless type, e.g., summarized above in (1-1). The value is introduced from the type of wireless.

(2-5) Utilizable Band

This is dynamic information that changes according to the utilization status of other terminals at the access point.

(2-6) Number of Terminals Connected to the Access Point

This is an index showing congestion of the access point. It may be difficult to measure the available band, and the number of connected terminals is often used as a parameter. For example, this can be obtained from the wireless LAN (3) access point.

(2-7) Application Type

This is information needed because the required QoS level varies according to the type of application. As indicated above, it is possible either to detect the type of application or to acquire the application information being executed from the terminal (4).

(3) Stability (3-1) Number of Terminals Connected to the Access Point

This is an index showing a congestion of the access point. It may be difficult to measure the available band, and the number of connected terminals is often used as a parameter. This information can be acquired by including in the communication conditions from each access point.

(3-2) Position of this Device

The position of this device can be acquired by providing a Global Positioning System (GPS) receiver (not shown) in this device (1).

(3-3) Movement Velocity

The movement velocity for the device can be acquired by providing an acceleration sensor, or the like, in device (1). It is possible to estimate an amount of time to stay at a particular access point within a coverage area.

(3-4) Coverage Area

It is possible to estimate a time that this device is capable of remaining at a particular wireless access by combining the coverage area for each wireless access with the position and movement velocity information of the device. To acquire this information, map information or the like of a communicable area for each wireless access is provided in the storage device (14).

(4) Cost (4-1) Communication Charge

A reference for the optimal wireless resource can be obtained based on a balance between a guaranteed QoS and a communication charge. Therefore, charge information is needed when utilizing each wireless resource. Specifically, the communication charge can be calculated from timing subroutine and a data table containing a list of charges.

(5) Power Consumption (5-1) Power Consumption for this Device When Connected to Each Wireless Access Since this device (1) is of mobile type, it can be powered by a battery. Thus, the battery capacity level and a power consumption rate are information employed to estimate the amount of time during which this device can be utilized. Data related to the estimated power consumption may be optionally stored in advance, and means for measuring actual power consumption may also be optionally provided.

Processing of the connection rule production portion (106) will be described.

This system is provided with an architecture for maximizing the level of a satisfaction depending on each user's preference in an environment where a communication quality dynamically fluctuates. Thus, the level of a user satisfaction is not simply the QoS of the application but also includes a level of user psychological satisfaction. Therefore, determining how to express the level of satisfaction in a numerical value and reflect that value in the connection rule when a certain user utilizes a certain wireless resource is an issue.

The above-described required conditions include a wide variety of types, from a type that can be depicted in a graph with respect to the level of user satisfaction such as the communication charge, to a type that cannot be directly mapped with respect to the level of user satisfaction such as an RSSI. This information can be roughly classified into four types, i.e., a communication quality, an application QoS, a subjective evaluation value, and a level of user satisfaction.

Herein, the communication quality refers to quality information that can be measured, such as an RSSI, a delay, a jitter, and a loss rate.

The application QoS refers to quality information in an application layer, such as a signal to noise ratio (S/N) in a video application.

The subjective evaluation values refer to a value evaluated by humans for the quality of the application. Five human senses are used to establish an evaluation reference that is closer to the user psychological satisfaction than that of the application QoS.

The level of user satisfaction is an evaluation value expressing a subjective level of satisfaction that reflects the preferences of each user.

This information can be converted to enable mapping with the level of user satisfaction. Accordingly, it is believed that all of the information can be reflected in the wireless resource selection.

Of these four types of information, the communication quality and the application QoS are closely correlated, and various research is performed on the reciprocal conversion of the both. Also, regarding the subjective evaluation value, an application QoS required value emerges to achieve the targeted Mean Opinion Score (MOS) value so the conversion of the both is also possible from the accumulation of subjective evaluation experiments.

These well-known correlations are provided in the connection rule production portion (106), as conversion conditions, in advance, and thus, definitions can be made based on the required conditions. In this case, an issue of the conversion between the user satisfaction and the subjective evaluation value remains. The subjective evaluation performs an evaluation in a precisely stipulated measurement environment such as International Telecommunication Union Radiocommunication Sector (ITU-R). However, for example, in the case of video streaming, when playing back a video with the same evaluation marks, there are users who are not satisfied, indicating "I'm getting charged this amount for only getting this level of image quality?", as well as adequately satisfied users who say "I get this good quality image with a mobile phone?".

Figure 5A:
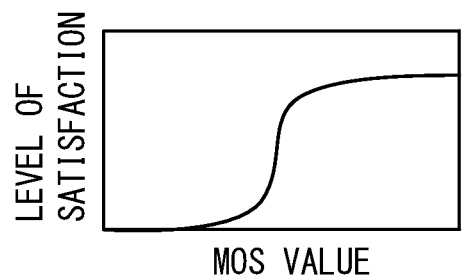
FIG. 5 is a graph showing a relation between a subjective evaluation value (MoS value) and the level of satisfaction.
Figure 5B:
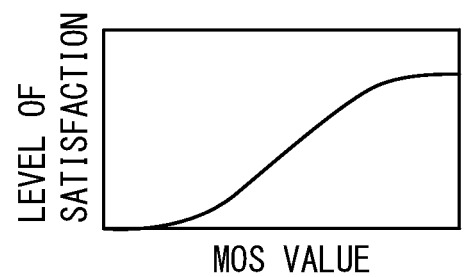
Figure 5C:
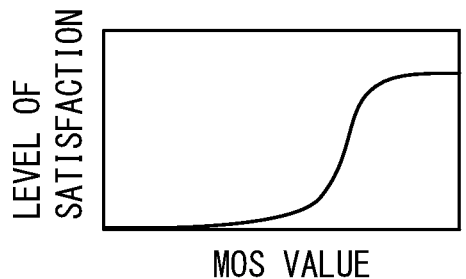

For example, there are various patterns such as those shown in FIG. 5, where graphs with the subjective evaluation value (MOS value) on a horizontal axis and the level of satisfaction on a vertical axis vary by user. A relationship between the MOS value and the level of satisfaction for a certain user is as shown in FIG. 5(*a*). This graph expresses that if a threshold value (equal to acertain MoS value) is exceeded, the user is satisfied; if that value is fallen below, the user is dissatisfied. On the other hand, there may be a user whose graph exhibits a more gradual curve as shown in FIG. 5(*b*), and a user whose graph exhibits a higher threshold value as shown in FIG. 5(*c*).

Figure 6:
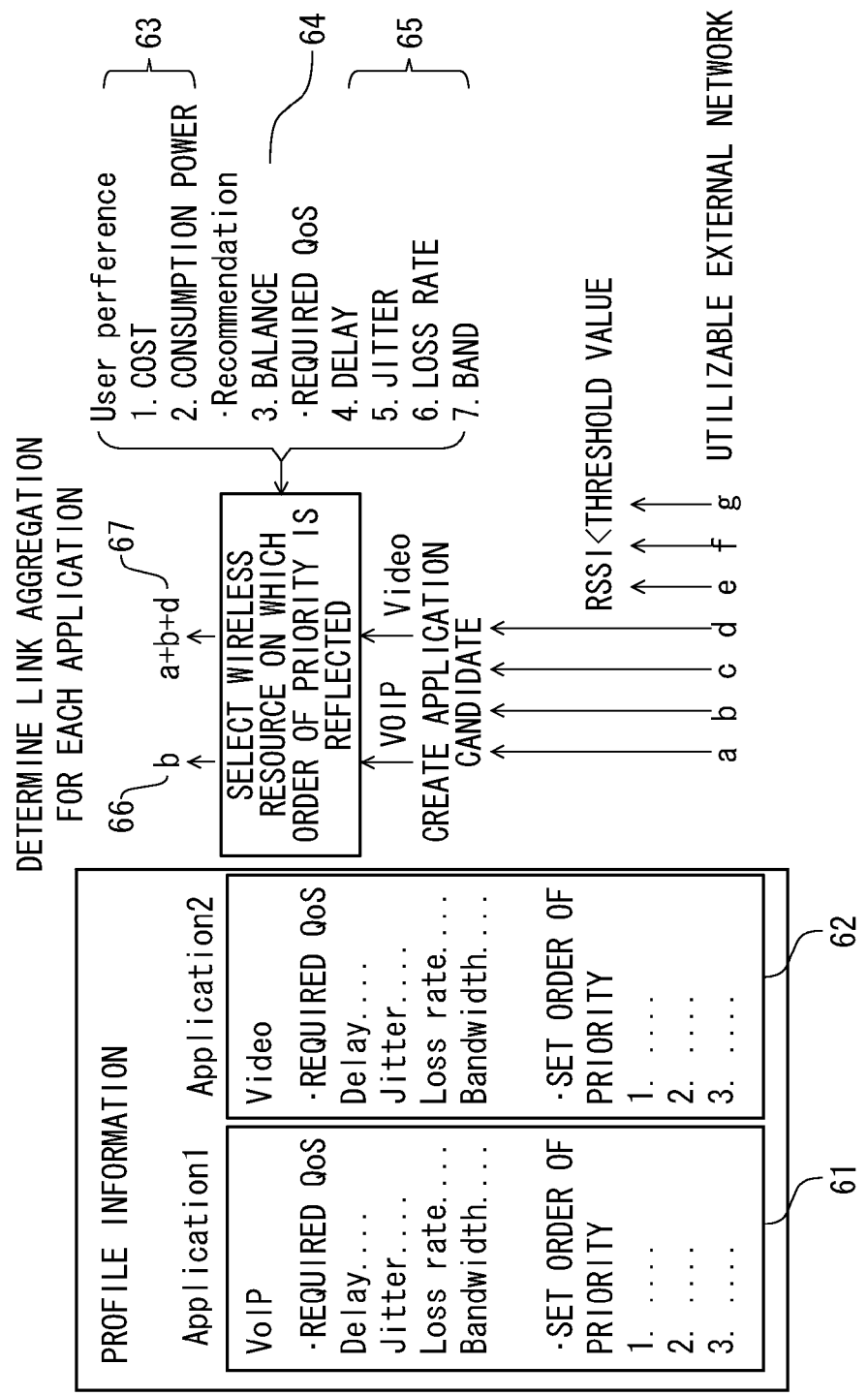
FIG. 6 is a selection algorism of a wireless resource that meets a user preference.

The connection rule production portion (106) is designed to create a correspondence between the level of satisfaction and the MOS value for each user and each application and to maximize the level of user satisfaction by reflecting it on the wireless resource selection. As shown in FIG. 6, as the profile information (141), the required QoS and the order of priority for the connected external network (for the Voice over Internet Protocol (VoIP) application (61)) are set. In the same manner, definitions are also made for the video application (62).

Additionally, a connection rule determining to select which external network according to an application executed by the terminal (4) is produced. For example, utilizable external networks a, b, c, d, e, f and g are provided. In this example, all of these networks are wireless LAN access points.

One of the networks a, b, c and d in which an RSSI value firstly obtained from a communication module scan exceeds a threshold value are selection candidates.

Also, the application stored in the profile information (141) is used as an application candidate, and in this state, the external network (wireless resource) optimal therefor is selected. At this point, the selection is made to satisfy the required conditions (63) regarding cost, power consumption and required QoS (65) of the profile information determined by the user. For example, of the utilizable external networks, networks that satisfy the required QoS (65) are first selected as the selection candidates. Subsequently, the selection candidates are narrowed to those that meet the user cost requirement and power consumption requirement (63). The cost requirement is defined by a maximum communication charge, a unit cost per time, a unit cost per packet, or the like. With respect to the requirements relating to the power consumption, the user may optionally provide a power consumption of a terminal and a battery capacity, and in this state, the user may set as a usable time.

In addition to the required condition (63) and the required QoS (65) set by the user, the balance of the level of user satisfaction (64) may be optionally taken into consideration. For instance, the balance information can be set as a rule for selecting a better selection candidate if the level of satisfaction rises by a predetermined value or more with a predetermined cost fluctuation width.

Using the algorithm described above, the connection rule production portion (106) selects a communication method b (66) in the case of the VoIP application (61) and selects a link aggregation (67) by communication methods a+b+d in the case of a video applications (62). These selection results are stored in a connection rule table. The network selection processing portion (102) is capable of selecting the external network according to the application used by referencing the connection rule table.

As described above, a link aggregation technique can be employed for connection with the external network. That is, a server device provided with link aggregate management portion is installed on the external network side to establish a link aggregation with a link aggregate management portion (107) arranged on the CPU (10) of this device (1). Since connection processing using the link aggregation is well known, the description will be omitted.

When link aggregation is employed in this device (1), good communication can be realized in the terminal (4) without the need to provide a plurality of communication modules in the terminal (4) or introducing software for link aggregation. In particular, by combining with the selection of a network according to the application, the optimal communication quality can be obtained without a need of recognition on the terminal (4) side.

Figure 7:
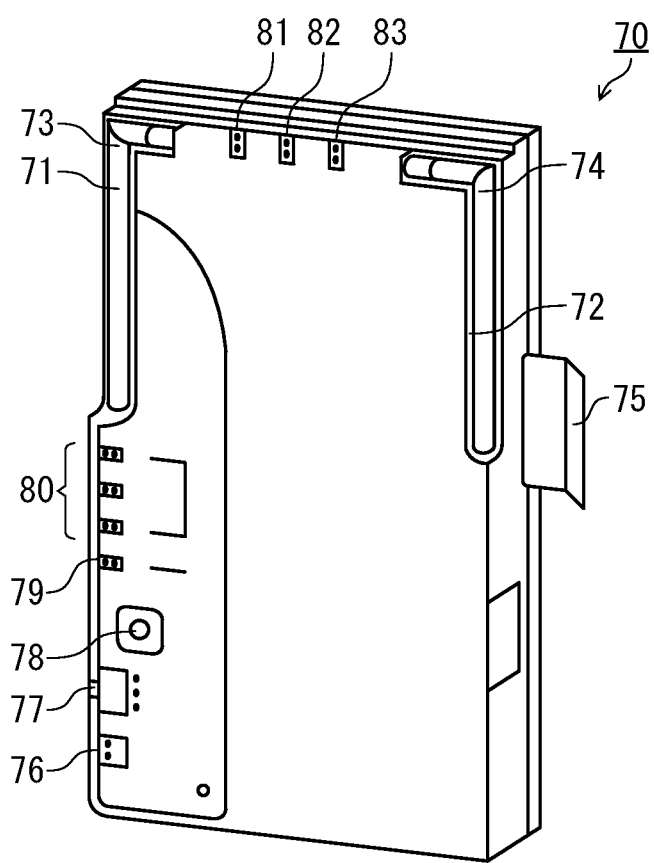
FIG. 7 is a perspective view showing the exterior of the present invention.

Finally, an embodiment of the exterior and the structure of this device (70) will be described. FIG. 7 is a perspective view showing the exterior of this device (70). This device (70) is easily portable with a size that can be held in a hand.

Two antennas (71) and (72) are arranged on both the top right and left sides. When carried, antenna base portions (73) and (74) at the top end are made foldable, and thus, it can be accommodated in a recess that matches the shape of the antennas (71) and (72). During use, a communication sensitivity can be enhanced by extending the antennas upwards from the recess.

A slot (75), into which a CF card is inserted, is provided in the middle of a side surface so as to be used for holding a PHS communication card, or the like.

User operation systems include, in order from the bottom right, a jack (76) for supplying power, a power switch (77), and a search button (78) for selecting an external network again.

Also included are indicators, such a light emitting diode (LED) (79) showing a connection status of the internal networks (wireless LAN), LEDs (80) showing a connection status of external networks (wireless LAN, CF cards, USB), a power display (81), an LED (82) showing an operation status, and a battery remaining amount display (83).

Figure 8:
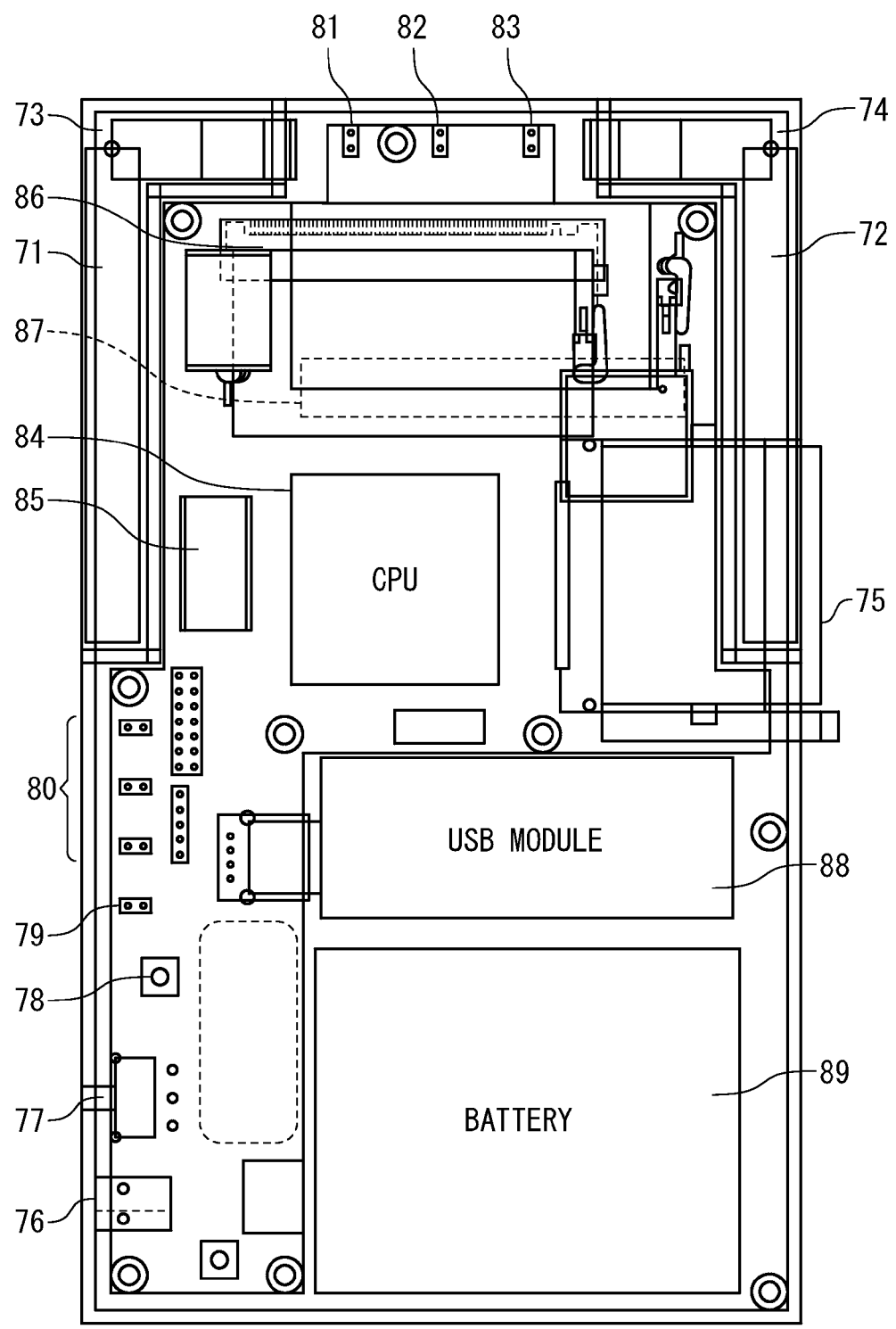
FIG. 8 is an exploded view showing the interior of the present invention.

FIG. 8 is an exploded view showing the internal structure of this device (70). In addition to the placement of a Synchronous Dynamic Random Access Memory (SDRAM) (85) configuring a CPU (84) and storage device on a circuit board, there are MiniPCI slots (86) and (87) arranged on both surfaces of the circuit board. In this way, the wireless LAN modules for the external network and the internal network can be connected, respectively.

Furthermore, a USB connector (88) and a communication module for a USB connection can also be housed. A chargeable battery (89) for driving when carrying is housed at a lower portion of the main unit.

The methods and system of the present invention has been described above and in the attached drawings; however, modifications will be apparent to those of ordinary skill in the art and the scope of protection for the invention is to be defined by the claims that follow.

We claim:

1. A user-portable mobile communication relay device relaying communication between an internal network and an external network, the mobile communication relay device comprising:
   an internal network communication adapter compatible with the internal network connecting to a single or a plurality of specific terminal devices;
   an external network communication adapter compatible with two or more external networks;
   a network selection processing portion for automatically selecting, from the external networks, one or more networks to be connected in accordance with stored profile information;
   an internal network connection processing portion for establishing or reconfiguring the connection to an internal network selected on pre-determined timing;
   an external network connection processing portion for establishing or reconfiguring the connection to an external network selected on pre-determined timing; and
   a communication relay processing portion for relay-processing communication between the internal network and the external networks,
   wherein
   in a configuration in which a selection rule for a communication channel concerns a wireless LAN, at least one of said external network connection processing portion or said internal network connection processing portion acquires information about available channels at a current site,
   produces an available channel table tabulating, number of available channels continued in back and front directions relative to each available channel, said available channel table including, for each available channel, a separate entry for the back direction and a separate entry for the front direction, and
   selects the channel according to an available status on the available channel table corresponding to a channel having available channels continued in back and front directions, and if no channel having available channels continued in back and front directions is available, selecting a channel with a weaker signal strength, and if neither selected channel can be found, selects another external network with the network selection processing portion.

2. The mobile communication relay device according to claim 1, wherein
   in said stored profile information, a priority ranking of the external networks to be connected is defined, and
   said network selection processing portion is also for selecting the external network according to the order of priority.

3. The mobile communication relay device according to claim 1, wherein
   in said stored profile information, verification information necessary for connection to each external network is stored, and
   said external network connection processing portion employs the verification information for establishing or reconfiguring the connection to the external network.

4. The mobile communication relay device according to claim 1, wherein
   in a configuration in which any server device on an external network side is previously provided with link aggregate management portion performing link aggregation integrating and dispersing traffic with a communication terminal into and over a plurality of links, said mobile communication relay device is provided with terminal link aggregate management portion performing link aggregation on traffic with the link aggregation management portion, and
   said network selection processing portion is also for selecting two or more combinations from a plurality of external networks and a plurality of channels on the wireless LAN.

5. The mobile communication relay device according to claim 1, wherein
   said network selection processing portion is provided with a connection policy information production portion employing required condition information input from input device or stored in the profile information regarding a predetermined communication parameter in the wireless communication network so as to produce said connection policy information table based on the required condition information, and
   said network selection processing portion is also for selecting the network according to the connection policy information table.

6. The mobile communication relay device according to claim 5, wherein
   said communication parameter is one of or a combination of a communication speed, a communication amount, a communication line load, a packet loss rate, a communication delay, a jitter, a radio wave strength, a communication fee, and a value calculated from a value of each of the preceding parameters according to a predetermined calculation formula.

7. The mobile communication relay device according to claim 5, wherein
   said mobile communication relay device is provided with: a communication network measurement information collection portion extracting from each wireless communication network any information on said communication parameters; and a connection policy information evaluation portion evaluating content of said connection policy information table based on the information collected by the communication network measurement information collection portion, and
   said connection policy information production portion is for updating each connection policy information table according to the evaluation.

* * * * *